United States Patent [19]

Kasprzyk

[11] Patent Number: 5,071,685
[45] Date of Patent: Dec. 10, 1991

[54] CERAMIC ARTICLES, METHODS AND APPARATUS FOR THEIR MANUFACTURE

[76] Inventor: Martin R. Kasprzyk, 2648 Ransomville Rd., Ransomville, N.Y. 14131

[21] Appl. No.: 469,028

[22] Filed: Jan. 23, 1990

Related U.S. Application Data

[63] Continuation-in-part of Ser. No. 252,771, Oct. 3, 1988, abandoned, which is a continuation-in-part of Ser. No. 928,204, Nov. 7, 1986, Pat. No. 4,789,506.

[51] Int. Cl.$^5$ .............................................. B32B 1/08
[52] U.S. Cl. .................................. 428/34.1; 428/34.4; 428/34.5
[58] Field of Search ............................ 264/22, 25, 60; 428/34.1, 34.4, 34.5

[56] References Cited

U.S. PATENT DOCUMENTS

| | | | |
|---|---|---|---|
| 801,296 | 3/1905 | Bolling | 423/299 |
| 1,266,478 | 3/1917 | Hutchins | 20/62 |
| 1,756,457 | 4/1930 | Fourment | 423/346 |
| 3,495,939 | 2/1970 | Forrest | 423/345 |
| 3,882,210 | 5/1975 | Crossley | 264/63 |
| 3,951,587 | 4/1976 | Alliegro | 264/60 |
| 4,154,787 | 5/1979 | Brown | 264/60 |
| 4,265,843 | 5/1981 | Dias et al. | 264/57 |

Primary Examiner—James Derrington
Attorney, Agent, or Firm—Donald C. Studley

[57] ABSTRACT

The present invention relates to composite articles of manufacture comprised of a continuous phase of silicon containing a discontinuous matrix of particulate material selected from silicon carbide, carbon, or mixtures thereof. The particulate materials have a minimum size of about fifty microns, and more preferably for enhanced performance, a minimum size of 100 microns. The present articles contain from about thirty to about seventy, and more preferably from about 35 to about 65 percent by volume of silicon. The present composites have strains to failure at high temperatures substantially higher than the reaction bonded silicon carbide composites of the prior art. The present composites also have a resistance to thermal stress at elevated temperatures superior to the prior art composites. In such respects, the present composite materials have characteristics more resembling a metal than a ceramic. The present composites are especially useful in the fabrication of shaped articles, for example, tubular articles.

11 Claims, 4 Drawing Sheets

CERAMIC ARTICLES, METHODS AND APPARATUS FOR THEIR MANUFACTURE

The present application is a continuation-in-part of U.S. Ser. No. 252,771, filed Oct. 3, 1988, now abandoned, which, in turn, was a continuation-in part of U.S. Ser. No. 928,204, filed Nov. 7, 1986, now U.S. Pat. No. 4,789,506.

BACKGROUND OF THE INVENTION

The present invention relates to ceramic articles comprised of silicon, silicon carbide and carbon, and to processes and apparatus for the manfacture of such articles.

Silicon carbide, a crystalline compound of silicon and carbon, has long been known for its hardness, strength, and excellent resistance to oxidation and corrosion. Silicon carbide has a low coefficient of expansion, good heat transfer properties and exhibits high strength and excellent creep resistance at elevated temperatures. These desirable properties may be attributed to a strong covalent chemical bonding, which also is the cause of an undesirable property of silicon carbide, that of being difficult to work or fabricate the material into useful shapes. For example, because silicon carbide dissociates at high temperatures, rather than melting, it is not feasible to fabricate articles by melt processes, and because silicon carbide has a very slow diffusion rate, fabrication by plastic deformation processes is not viable.

It has been proposed to produce shaped silicon carbide articles by forming bodies of silicon carbide particles and either bonding or sintering the particles at high temperatures to form a consolidated body. If the particulate silicon carbide starting material is fine enough, and suitable sintering aids are added, the fine, particulate material will exhibit sufficient self-diffusion at high temperatures that the particulate material will sinter and form into a substantially dense single phase material. Sintering processes, in general, require fine powder starting materials and pressureless sintering processes, in particular, require an even finer starting material. Because of the needed fineness and high purity of the starting materials, articles formed by sintering processes are relatively expensive.

Coarser and less pure silicon carbide powders are known to bond together at high temperatures. However, the resultant products have considerable porosity and for that reason are usually not as strong, or as corrosion resistant, as more fully densified materials. The properties of such materials may be substantially improved by infiltrating the pores of such materials with silicon, in either vapor or liquid form, to produce a two phase, silicon-silicon carbide product. Although such processes utilize relatively inexpensive coarse powders as starting materials, they require two high temperature furnacings, one to form the silicon carbide to silicon carbide bond and a second, separate furnacing, to infiltrate the formed body with silicon.

Mixtures of coarser and less pure silicon carbide powders with particulate carbon or with a carbon source material may be preformed and subsequently impregnated with silicon at high temperature to form "reaction bonded" or "reaction sintered" silicon carbide products. The carbon component may be in the form of particulate graphite or amorphous carbon, or may be in the form of a carbon source material, for example a carbonizable organic material, such as, pitch, resin or similar materials, which will decompose during furnacing to yield carbon. The infiltrating silicon reacts with the carbon in the preformed body to form additional silicon carbide which bonds with the orginal silicon carbide particles to produce a dense silicon carbide article. Typically reaction bonded silicon carbide materials are characterized by almost zero porosity and the presence of a second phase, or residual, of silicon, usually greater than about 8% by volume.

In typical siliciding or typical reaction bonding processes, the particulate silicon carbide and carbon starting material is initially preformed or preshaped into an article, commonly referred to as a "green body", which is subsequently fired. The particulate silicon carbide and carbon starting mixture is commonly blended with a binder to aid in shaping. If the binder is dry, or relatively dry, the powder may be compacted to the desired shaped green body using a press or isopress. If the binder is liquid, or semi-liquid, and is used in sufficient quantity, the mixture may suitably be slip cast, extruded or injection molded to form a shaped green body.

High temperature heat exchange components desirably have relatively thin walls to facilitate high rates of heat transfer. There have been previous attempts to fabricate tubular articles of silicon carbide by various methods, however, none have proven commercially successful. For example, U.S. Pat. No. 801,296 discloses a method of producing a hollow silicon carbide tube by siliciding a solid carbon rod to form an outer layer of silicon carbide and subsequently burning out the carbon interior leaving the outer layer of silicon carbide. U.S. Pat. No. 1,266,478 describes a typical method of preforming a tubular body of silicon carbide and carbon and siliciding to obtain a tubular silicon carbide article. U.S. Pat. No. 1,756,457 teaches the reaction of silicon dioxide and carbon in preformed columns to produce a silicon carbide tube. U.S. Pat. No. 3,495,939 teaches making tubular silicon carbide by preforming a tube of particulate silicon carbide and carbon, positioning the tube vertically in a furnace and siliciding with the bottom of the tube in contact with liquid silicon. U.S. Pat. No. 3,882,210 teaches siliciding a preformed tube of alpha silicon carbide and graphite to produce a tube of silicon carbide. U.S. Pat. No. 4,265,843 describes the manfacture of silicon carbide in tubular form by initially heating at low temperature a rotating preformed carbon tube in the presence of silicon to impregnate the tube and subsequently heating at a higher temperature to react the silicon and carbon to form a tube of silicon carbide. U.S. Pat. No. 4,795,673 describes a composite material consisting of silicon containing submicron silicon particles. The foregoing references represent the most pertinent prior art to which applicant is presently aware.

It will be appreciated that the fabrication of long, (e.g., four to eight foot), large diameter, (e.g., four to eight inch OD), thin-walled, (e.g., ⅛ to ¼ inch), tubes presents a difficult problem. The tubular green bodies that are required to be initially formed by the prior art processes are inherently structrually weak and easily deformed or broken unless handled with utmost care. In subsequent processing steps, the tubular green bodies must be carefully dried, and/or baked, and positioned in a furnace for siliciding. The fragility of the preformed bodies and the required multiple handling entailing high labor imput have been major factors in preventing the use of tubular silicon carbide in many applications purely on the basis of cost. The term "reaction sinter" as used herein means consolidation by chemical reaction and includes the reaction of silicon with carbon either alone or in mixture with silicon carbide.

The term "carbon" as used herein means carbon or a carbon source material that produces carbon upon heating that will react with the infiltrating silicon to form additional silicon carbide, in situ.

The term "tubular" as used herein means that the article has the form of a tube, that is, it is fistulous. Although the present invention will hereinafter be described in terms of tubes having generally round cross-sections, it will be understood that the invention is not so limited and that tubes having eliptical, square or multi-sided cross-sections, or having an external surface of one cross-sectional type and an internal surface of another, may as easily be produced. It will also be understood that the present invention also contemplates tubular articles that have internal separations, or septums, providing multiple passageways within the tube.

GENERAL DESCRIPTION OF THE INVENTION

The present invention relates to composite articles of manufacture comprised of a continuous matrix of silicon containing a discontinuous phase of particulate material selected from silicon carbide, carbon, or mixtures thereof. The particulate materials have a minimum size of about fifty microns, and more preferably for enhanced performance, a minimum size of one hundred microns. The present articles contain from about thirty to about seventy, and more preferably from about 35 to about 65 percent by volume of silicon. The present composites have strains to failure at high temperatures substantially higher than the reaction bonded silicon carbide composites of the prior art. The present composites also have a resistance to thermal stress at elevated temperatures superior to the prior art composites. In such respects, the present composite materials have characteristics more resembling a metal than a ceramic. The present composites are especially useful in the fabrication of shaped articles, for example, tubular articles.

The method of forming tubular articles consists of the steps of concentrically positioning at least one hollow, vertical tubular column of particulate silicon adjacent to, or contiguous to, at least one hollow, vertical tubular column of particulate silicon carbide, carbon, or mixtures of silicon and carbon, and heating the adjacent columns to a siliciding temperature, that is, a temperature above the melting point of silicon (about 1410 to 1420 degrees C.) and less than about 2400 degrees C. At such temperatures the particulate silicon component melts or vaporizes and infiltrates into the pores of the column containing the particulate silicon carbide, carbon, or mixtures thereof, forming a tubular ceramic product.

The apparatus consists of a plurality of supply hoppers for holding a particulate feed material, a loading means comprised of at least two spaced, concentrically arranged, dimensionally stable, tubular form members. The loading means is of a size to spacedly fit within the furnace tube of a vertically positioned electrical induction furnace and is moveable in and out of the furnace tube. Selected particulate feed materials are dry cast, suitably by flowing, into the spaces between and around the form members. For example, the loading means is initially centrally, or coaxially, positioned in the furnace tube, spacedly surrounding the furnace heating element. After the filling, or dry casting, operation is completed, the loading means is removed from the furnace. The space between the outer form member and the inner furnace wall is suitably filled with a particulate heat-insulating material, the space between the form members is selectively filled with silicon carbide, carbon, or mixtures thereof and the space between the inner form and the heating element is selectively filled with silicon. After the dry casting operation, separate vertical, hollow columns of particulate feed materials remain concentrically arranged within the furnace. The furnace is subsequently progressively, or incrementially, heated from top to bottom to a siliciding temperature. The silicon component infiltrates the column containing silicon carbide, carbon or mixtures thereof. The infiltrated column is subsequently cooled to form a dense, tubular silicon-silicon carbide product.

The particulate silicon carbide starting material is suitably of a sufficiently coarse particle size that the material is easily flowable. Suitably the particles are greater than about 50, and preferably greater than about 100 microns, and less than about 1500 microns in diameter. The particulate silicon carbide starting material may be of a single particle size or may consist of a combination of separate particle sizes to enable higher packing efficiencies.

Particulate carbon may be utilized as a sole feed material, or may be used in mixture with particulate silicon carbide. As discussed more fully below, particulate carbon of relatively small particle size reacts with the infiltrating silicon to form silicon carbide, in situ, thus reducing both the amount of free unreacted silicon remaining in the finished product and the amount of free carbon that might be desired in the product. Minor, or minimal amounts of free silicon and carbon may be desired if the end product requires abrasion, oxidation, or corrosion resistance, as the hardness and chemical inertness of silicon carbide is greater than that of either silicon or carbon. Particulate graphite starting materials in spherical form have been found to be particularly aptly suited to use in the present invention.

In a particularly useful embodiment of the invention the continuous matrix consists of silicon and the discontinuous matrix consists substantially completely of particulate carbon. If the particulate carbon starting material has a size less than about 50 microns, the carbon particles are substantially completely converted to silicon carbide and the product will not contain a desired carbon component. Starting carbon particles ranging in size from about fifty to about 100 microns usually react with silicon to form a surface coating of silicon carbide. Such three phase composite materials are aptly used in applications in which exposure to carbon is undesirable. Starting carbon particles having a size greater than about 100 microns produce a product that is substantially two phase, that is, particulate carbon in a continuous matrix of silicon carbide. Such products have excellent resistance to thermal stress and high strains to failure at elevated temperatures.

Particulate graphite may be used as the particulate carbon starting material. The presence of a large amount of graphite phase affects the physical properties of the present products. Graphite, a crystalline form of carbon, has a low elastic modulus, low thermal expansion rate, and a high thermal conductivity. When incorportated in the present products in amounts over about ten percent by volume, the products show improved thermal shock and thermal stress resistance. Amounts of greater than about 65 percent by volume are difficult to achieve using silicon infiltration processing.

The present process may be characterized in that no green body, a prerequisite of the previous tube forming methods, is required or produced by the present invention. Particulate material is fed into the furnace, and after firing, a finished ceramic tube is removed from the furnace. The present product may be characterized by a continuous matrix of silicon containing discrete particles of silicon carbide, carbon, carbon particles having a coating of silicon carbide, or mixtures thereof.

DETAILED DESCRIPTION OF THE INVENTION

The present articles are composites which contain silicon in free, unreacted, and in chemically combined forms. The composites are comprised of a continuous matrix of free, unreacted, silicon surrounding a discontinuous phase of a particulate material of a comparatively large size, that is, the particulate material is preferably of a size greater than about fifty and more preferably greater than 100 microns in diameter. The particulate material is comprised of silicon carbide, carbon, carbon having a coating of silicon carbide, or mixtures thereof. The final product may contain from about thirty to about seventy percent by volume silicon. Preferably and more typically in accord with the present invention, the present products contain from about 35 to about 65 percent by volume free silicon with the remaining volume comprised of discrete particulate materials.

The composite articles are produced by dry casting, that is by forming, suitably by flowing, adjacent, or contiguous hollow, coaxially arranged, vertical columns of selected particulate starting materials. The hollow concentric columns of particulate material are subsequently heated to react the materials in the columns to form a tubular product. The columns individually consist of particulate silicon and of particulate silicon carbide, carbon, or mixtures thereof. The attached drawings, discussed in detail below, illustrate apparatus particularly suited to carrying out a dry casting process. The heating step is preferably carried out by induction heating, under an inert atmosphere, or in a vacuum. Suitable siliciding temperatures are above the melting point of silicon, usually at least about 1500 degrees C., but below about 2400 degrees C.

The silicon starting component is suitably particulate and can be commercial grade silicon, having an average particle size ranging from about 100 to about 1000 microns. A particularly useful silicon material ranges from about 175 to about 500 microns in diameter. The size of the silicon particles is not critical, except for flow and packing characteristics, as the silicon component is completely melted during the siliciding process.

A suitable particulate silicon carbide starting component has a diameter greater than about 50 microns and smaller than about 1000 microns, and more preferably a particle size between about 50 and about 500 microns in diameter. Particularly useful are silicon carbide particles having a diameter greater than about 150 and smaller than about 300 microns. The silicon carbide component may suitably be selected from alpha or beta phase silicon carbide. Mixtures of alpha and beta phase material may be used. The silicon carbide starting material does not require seperation or purification, minor amounts of unreacted carbon, silicon and silicon dioxide, as well as minor amounts of impurities such as iron, calcium, magnesium and aluminum, may be present without deleterious affect.

The carbon component may be either amorphous carbon or graphite provided that it is of a size that it is free-flowing and is free-flowing when used in mixtures with silicon carbide. Carbon materials having a relatively small size, that is, a particle size ranging between about 0.01 and about twenty microns, and with a typical average particle size ranging between about 0.5 and about 25 microns may be utilized if no carbon is desired in the final product. However, in the case of the present invention as it relates to a novel product having unreacted carbon in the final product, a relatively coarse carbon starting material is required, that is, carbon materials having a minimum particle size of at least about fifty microns and more preferably at least about 75 microns and with typical particle sizes ranging from about 75 to about 1500 microns and more preferably between about 100 to about 1000 microns. Particle sizes of less than about fifty microns react with the infiltrating silicon to form silicon carbide, thus preventing or reducing the amount of carbon particles desired in the final product. Carbon particles less than about fifty microns generally produce a product having a continuous matrix of silicon containing particulate silicon carbide because of the surface reaction, between the carbon and the entering silicon, the particulate carbon is converted into silicon carbide and such products usually do not exhibit a substantially improved resistance to thermal stress. The use of carbon particles having a minimum size of greater than about fifty microns yields a product having substantially improved resistance to thermal stress over a broad temperature range.

In carrying out the present siliciding operation the hollow column of particulate silicon melts and infiltrates into the hollow column containing particulate silicon carbide, carbon, or mixtures thereof. In such event the wall of the latter column may be subject to partial collapse because of the loss of support of the adjacent wall as the silicon component is removed by melting. This situation can be greatly minimized, or prevented entirely, by blending a small amount of a dry particulate temporary binder, for example, a thermosetting resin, suitably a phenolic resin, in the feed material used for the column comprised of silicon carbide, carbon, or mixtures thereof. Alternatively resin may be added to the feed material by dissolving the resin in a solvent, such as, acetone, and blending the resin solution into the feed material. Subsequent drying will deposit the resin in a coherent, substantially even manner on the particles of the feed material. Amounts of resin between about one-half and about five percent by weight of the feed material are generally useful. The binder should be one that will leave a carbon residue in the column upon heating, in such case the residue will provide additional carbon for reaction with the silicon component.

The siliciding step is carried out at temperatures above the melting point of silicon, about 1410 to 1420 degrees C., and at a temperature less than about 2400 degrees C. The siliciding step is carried out in an inert atmosphere, or in a vacuum, the latter being preferred. Vacuums between about 0.1 Torr and about 100.0 Torr are eminently suited to use. If an inert atmosphere is utilized slightly higher siliciding temperatures will usually be required. Suitable inert atmospheres are for example, nitrogen and nobel gases, such as, argon and helium. An inert atmosphere is one that will not deleteriously affect the siliciding process. After the siliciding process is complete, the tubular product is preferably allowed to cool in the furnace to a temperature below about 300 degrees C. while the inert atmosphere or vacuum maintained to prevent oxidation of the product. The weight amount of silicon to completely infiltrate the hollow column of particulate silicon carbide, carbon, or mixtures thereof, can be calculated from the packing density of the silicon carbide or carbon grain, the amount and type of carbon, the particle size of the components and the desired thickness and composition of the tubular product. The proper amount may be calculated from such data, or may be determined emphirically.

The preferred form of heating is by electrical induction heating and a preferred furnace is a vertical vacuum induction furnace which may be of a core-type or a coreless type. Heating is carried out from the top of the furnace to the bottom, that is, the siliciding process is progressively carried out starting from the top of particulate, concentrically arranged, hollow columns of the starting materials and proceeding to the bottom, or base, of the columns.

The present products, especially those containing encapsulated free carbon, or graphite, have excellent resistance to thermal stress failure. Silicon metal is brittle at temperatures below about 700 degrees Centigrade. Above that temperature silicon metal exhibits the more typical property of metals, the capability of plastically deforming with increasing temperatures.

It is postulated that the present composite materials, especially those containing carbon particles, resist thermal stress by two mechanisms. First, below about 700 degrees Centigrade they have a low elastic modulus due to the inclusion of carbon, or graphite, particles. Above about 700 degrees Centigrade the present materials perform well because of the silicon metal matrix.

It is necessary that the present products have continuous matrix of silicon, that is, the particles do not significantly bridge one upon the other. It will be appreciated that the embodied particulate materials may have an occasional point contact with one another because the particulate material begins as a column of loose grains held together by gravity. However, photomicrographs show that the silicon phase is substantially completely continuous and that the particles are substantially completely discontinuous, appearing as discrete islands in the silicon matrix.

In a particularly useful embodiment, the material contains a discontinuous carbon, or graphite, phase, generally comprising from about forty to about sixty-five percent by volume. The discontinuous phase consists of relatively coarse particles, greater than about 100 microns. Such products are found to lack any apparent silicon carbide phase, that is, the particulate carbon, or graphite, starting material is found distributed through the product in a substantially completely unreacted condition. Such products are found to have excellent resistance to thermal stress, withstanding temperature changes in the order of about 1300 degrees Centigrade, as compared to failure temperatures in the range of from about 100 to 300 degrees Centigrade for typical reaction bonded silicon-silicon carbide materials.

THE DRAWINGS

The invention will now be further illustrated in greater detail by reference to the attached drawings which illustrate apparatus particularly suited to carry out the present invention. Similar components are designated by like reference numbers throughout the several views.

Figure 1:
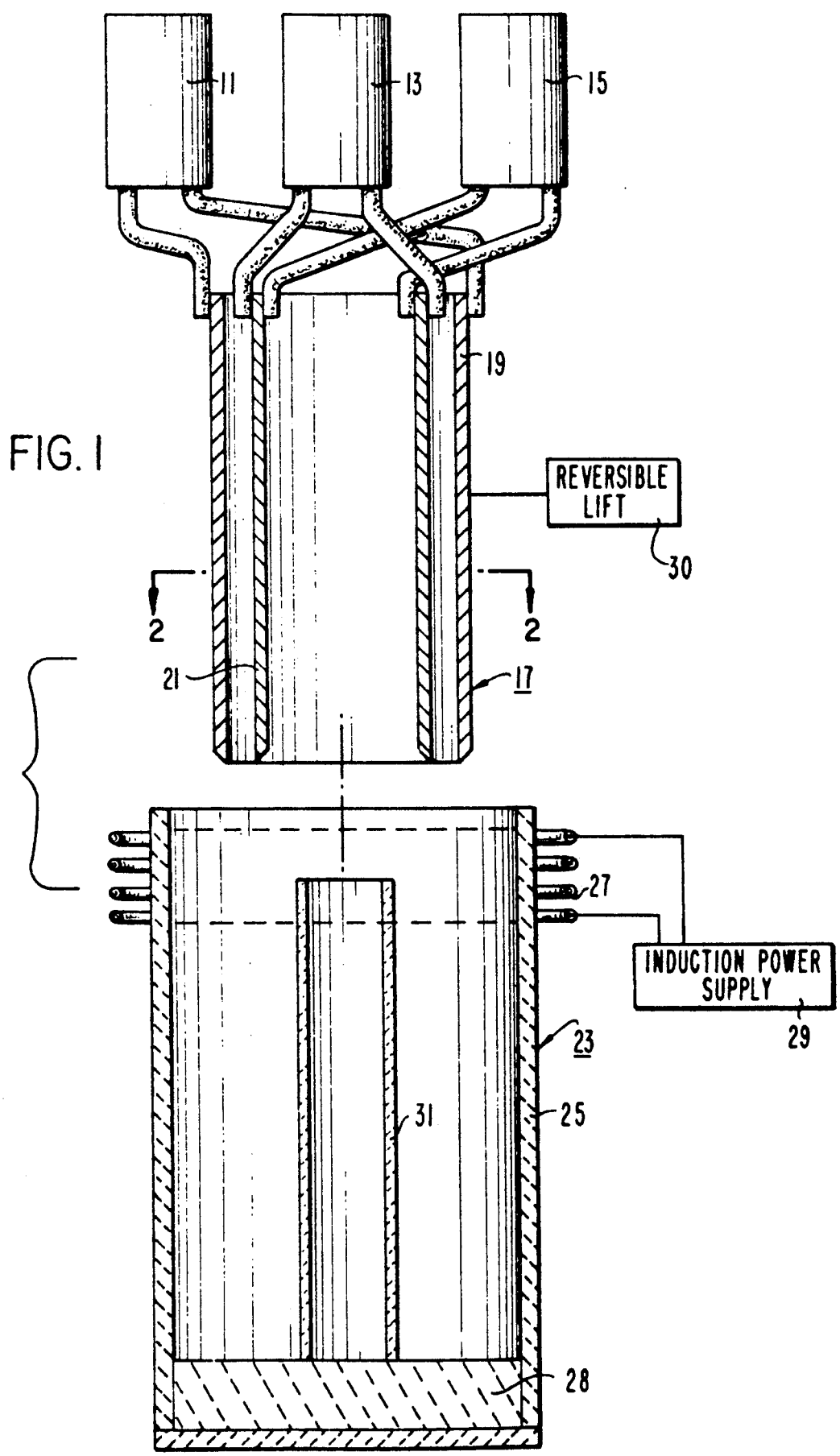
FIG. 1 is an front elevational sectional view showing a preferred furnace loading apparatus.

Looking now in detail at FIGS. 1 through 4, particulate feed material is supplied through supply hopper means, such as, 11, 13, 15. Suitably there is one hopper provided for each hollow vertical column of particulate material that is to be formed in the furnace. For example, as shown, one hopper would supply particulate silicon, one would supply particulate silicon carbide, carbon, or mixtures thereor, and one would supply particulate heat-insulating material. Loading means 17 is comprised of a plurality, at least two, concentrically arranged, dimensionally stable, hollow, open-ended cylindrical form members, 19 and 21, suitably fabricated of thin metal tubes. Loading means 17 is of a size that will spacedly fit within vertical vacuum induction furnace 23. Loading means 17 is positioned on insulating material, such as, 28, which suitably is particulate fused quartz. Induction furnace 23 is suitably comprised of a furnace tube 25, a vertically moveable induction coil 27 electrically connected to an electrical induction power supply 29. As shown, in FIGS. 1 through 5 and 7, induction furnace 23 also includes a heating core, or element, for example, 31. Furnace tube 25 is suitably fabricated of fused quartz, as such material is a good electrical insulator, is substantially impervious, can withstand reasonably high temperatures, has good thermal shock resistance, and is commercially available in large tubular forms. Heating element 31 is suitably fabricated of graphite and may be in the form of a simple hollow tube of graphite without spirals or cuts usually required in resistive heating elements. Loading means 17 is moveable in and out of furnace tube 25, suitably by means of a reversible lift, such as 30, of a type well known in the art, for example, an adjustable screw, rack and pinion, or worm gear arrangement.

Figure 2:
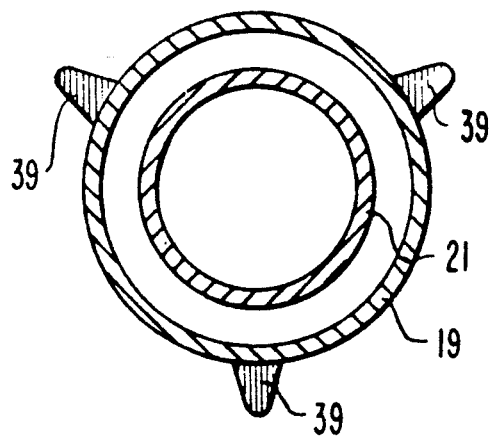
FIG. 2 is a sectional top view of the loading apparatus taken along lines 1—1' of FIG. 1 and also illustrates a centering, or spacing, means that may be utilized.

FIG. 2 illustrates a centering, or spacing, means, 39, that may be positioned on the outside periphery of loading means 17. Spacing means 39 are eminently useful in enabling loading means 17 to be centered within furnace tube 25. Spacing means 39 may be in the form of extentions such as feet, or in the form of narrow, preferably intermittent, strips positioned along the periphery of outer form member 19.

Figure 3:
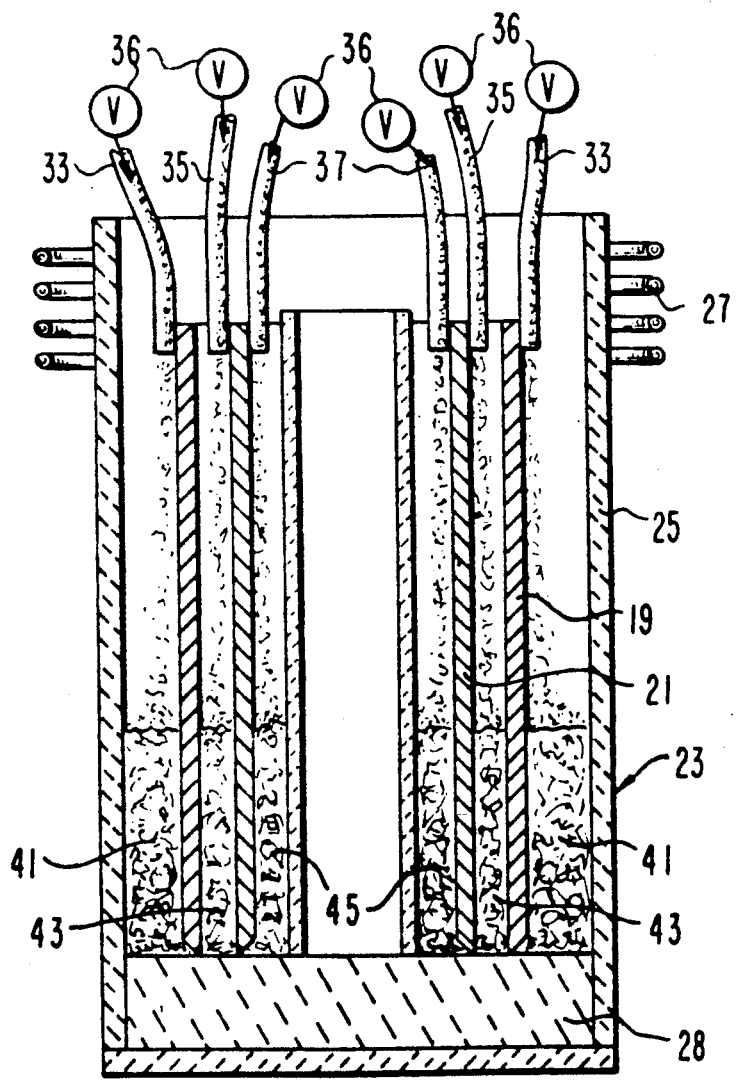
FIG. 3 is a partial vertical section of the induction furnace of FIG. 1 showing the loading means positioned within the furnace and the furnace being charged by the present dry casting method.

To load furnace 23, loading means 17 is lowered to the position shown in FIG. 3, by a reversible lift means, such as 30, into contact with insulation 28 positioned on the interior base portion of furnace tube 25. Loading means 17 is positioned so that it is centered, or substantially centered, within furnace tube 25. Hopper means 11, 13 and 15 have a plurality of feed means, or supply lines, such as, 33, 35 and 37, which may be in the form of hoses or chutes, separately connecting the individual hoppers with the spaces around and between form members 19 and 21. The feed means may include valves, such as 36, to control the flow therethrough. As shown the spaces in and around form members 19 and 21 are annularly defined by the inside of the furnace tube, the form members and the core, or heating element.

As shown in FIG. 3 loading means 17 is centered, or substantially centered, within furnace tube 25. The annular spaces defined by the interior of furnace tube 25, loading means 17 and by heating element 31 are being charged with particulate material from hoppers 11, 13 and 15. As shown, the annular space between the interior of furnace tube 25 and the outside of cylindrical form member 19 of loading device 17 is partially filled with particulate insulating material 41. Insulating material 41 functions to provide physical support for one surface of the particulate reactant material, insulate the furnace tube from high temperatures and allow the final product to be easily removed from the furnace tube. Insulating material 41 may be of any material which does not react with silicon, silicon carbide, carbon, or the material of the furnace tube. The material is one that is not wetted by molted silicon, that is, it is not silicon infilitrated. Boron nitride, aluminum nitride, silicon nitride, and oxides such as aluminum oxide, zirconia oxide and fused quartz are useful, boron nitride and aluminum nitride and fused quartz R have been found to be eminently useful. The annular space defined by the outside of cylindrical form member 21 and the inside of cylinder 19 is filled with particulate silicon carbide, carbon, or mixtures thereof, 43. The annular space defined by the inside of cylindrical form member 21 and heating element 31 is filled with particulate silicon, 45. The outside surface of heating element 31 is coated with a thin layer of boron nitride, aluminum nitride or silicon nitride to prevent molten silicon from wetting or reacting with it. It has been found that heating elements of high density, fine grain graphite are more resistant to molten silicon than low density, coarse grain graphite.

Figure 4:
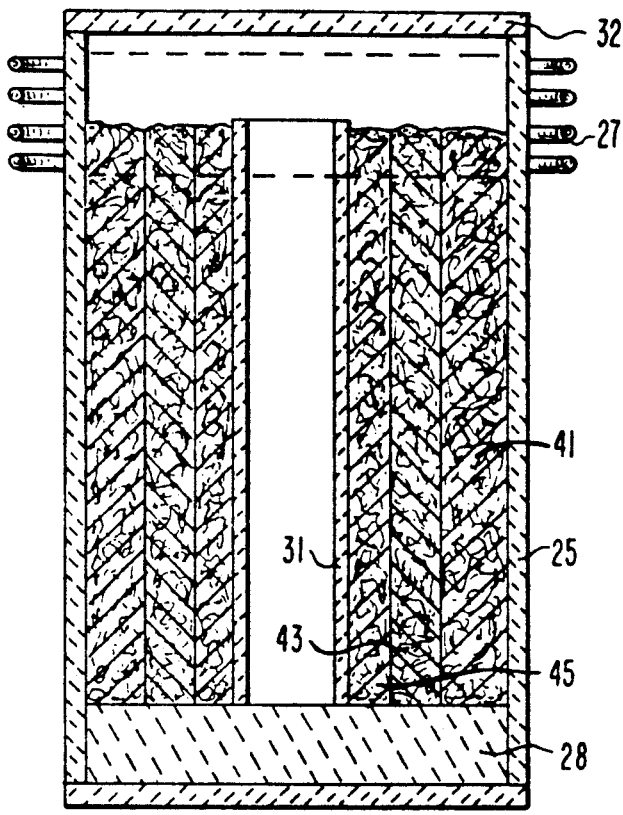
FIG. 4 is a partial vertical section of the induction furnace of FIG. 1 as the furnace would appear when fully charged and the loading means has been removed.

FIG. 4 shows the arrangement of FIG. 3 after furnace tube 25 has been charged. Loading means 17 has been removed from furnace tube 25 leaving hollow columns of reactant materials and insulating material. Cover 32 has been placed on tube 25. The space between the furnace charge and cover 32 may suitably be filled with an insulation material similar to that used in the base portion of the furnace.

Moveable induction coil 27 is then positioned at the top portion of furnace tube 25 and activated causing heating element 31 to increase in temperature. When heating element reaches a sufficiently high temperature, the hollow column of particulate silicon is melted and infuses, or infiltrates, into an appropriate adjacent column of particulate material. Induction coil 27 is then progressively moved downward along furnace tube 25, suitably by reversible lift means, such as 30, thus incrementally carrying out the siliciding process.

Figure 5:
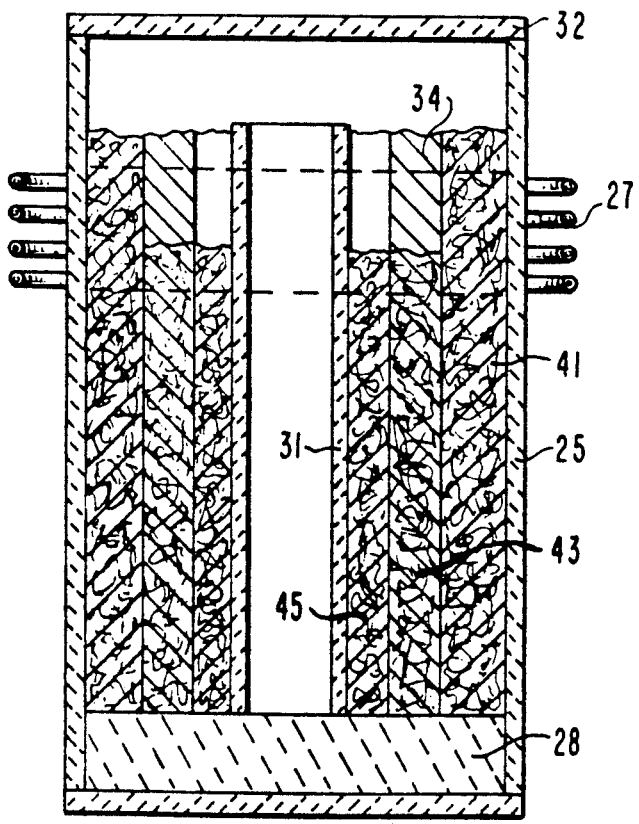
FIG. 5 is a partial vertical view of the induction furnace of FIG. 1 showing the furnace being heated to siliciding temperature and the tubular product being produced.

FIG. 5 illustrates the arrangement of FIG. 4 after initial heating of the furnace has begun. As shown the top portion of the silicon column has partially melted and infiltrated into the column containing silicon carbide, carbon, or mixtures thereof forming tube 34. Heating to siliciding temperature is progressively carried out from the top to the bottom of the furnace.

Figure 6:
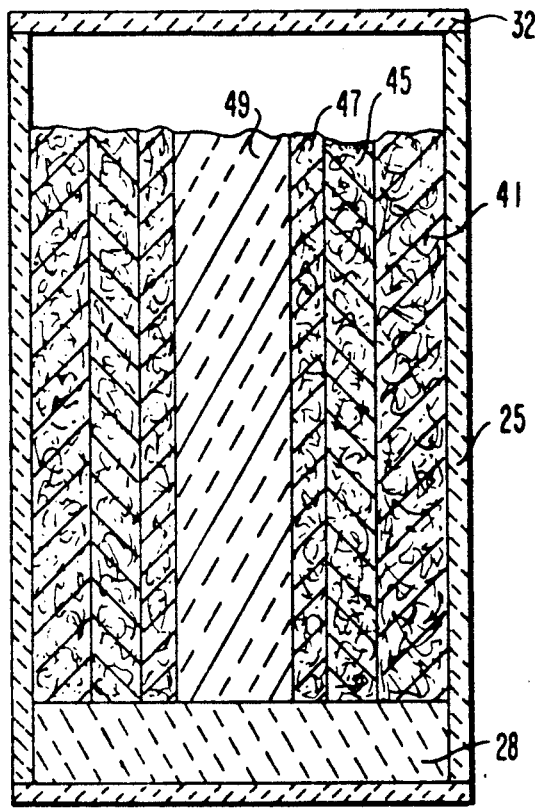
FIG. 6 is a partial vertical view of the induction furnace of FIG. 1 showing an alternative arrangement wherein the furnace is of the coreless type, that is, no internal heating element is utilized.

FIG. 6 illustrates an alternative arrangement whereby a coreless type furnace is employed, that is no heating element, as such, is utilized. In this arrangement a vertical column of carbon, preferably graphite, 47, is used as both a reactant and as the heating element. The center portion, or core, of furnace tube 25 is filled with insulating material 49.

Figure 7:
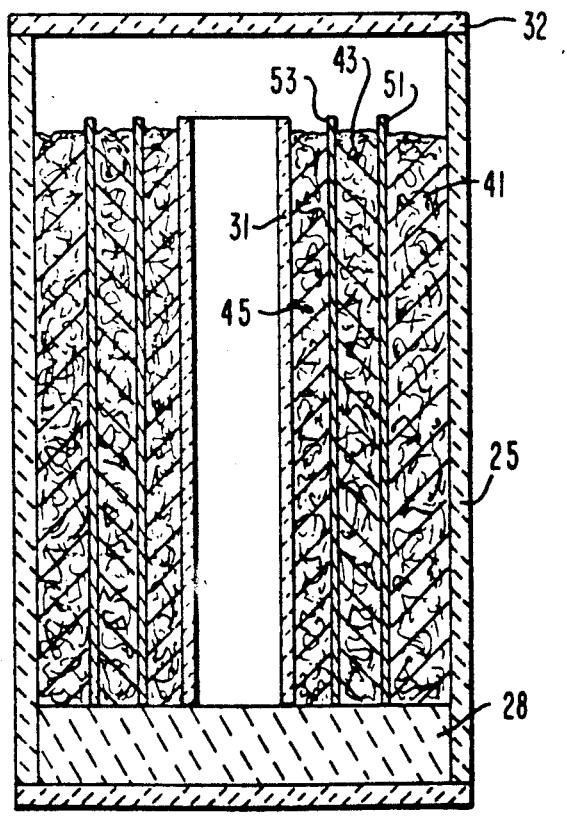
FIG. 7 is a partial vertical view of the induction furnace of FIG. 1 showing an alternate arrangement in which the particulate columns have an additional, temporary support means.

FIG. 7 illustrates a further alternative in which temporary supports 51 and 53 are provided to give additional stability to the columns of particulate materials and enable easier removal of loading means 17. Supports 51 and 53 are suitably fabricated of a combustible material such as paper. Waxed or coated paper may be used. Materials that are completely combustible or materials that leave a carbon residue are equally suitable.

The invention will now be described in greater detail by reference to the following examples, which are intended to illustrate, and not limit the scope of the invention. In the following examples, all parts are parts by weight and all temperatures are in degrees Centigrade.

EXAMPLE 1

A loading apparatus and vertical vacuum induction furnace as illustrated above was utilized. The loading means had an outside tube, corresponding to 19 in the drawings, having an outside diameter of 2.25 inches, and an inside diameter of 2.152 inches. One end of the tube was beveled toward the inside surface to form knife edge having a diameter of about 2.15 inches. The device had an inner tube, corresponding to 21 in the drawings, having an outside diameter of 2.0 inches and an inside diameter of 1.902 inches. One end of the inner tube was beveled toward the outside to form a knife edge with a diameter of 2.0 inches. The inner tube was held in concentric position within the outer tube by means of set screws.

The loading means was centered in a fused quartz furnace tube having a 2.772 inch inside diameter, a 3.025 inch outside diameter and a length of 24 inches. The furnace tube was positioned vertically in a support frame. The bottom end of the furnace tube was closed with a flat rubber vacuum gasket held by an aluminum plate to which a vacuum hose and pump were connected. The bottom three inches of the quartz tube were filled with $\frac{1}{8}$ inch thick carbon felt discs to thermally insulate the rubber vacuum gasket.

Three feed hoppers were used. One for boron nitride grain SHP-40 grade, a product of Sohio Engineered Materials Company, one for silicon grain, grade Siligrain SG1-20 mesh, a product of Elkem Metals Company, and one for silicon carbide grain, a blend of 95% 50/100 mesh size No. 1, a product of Exolon-ESK Company and 5% dry phenolic resin, Dyphene grade 877P, a product of Sherwin-Williams Company.

The particulate feed material was fed through eighteen plastic $\frac{1}{4}$ inch inside diameter feeder tubes, six tubes for each of the feed materials. The feed tubes were arranged around the periphery of the top of the loading means in 60 degree increments. The feed tubes were arranged to feed particulate boron nitride in the space between the outer tube on the loading device and the inside of the furnace tube, particulate silicon carbide within the tubes of the loading means, and particulate silicon in the space between the inside of the loading means and the outside of furnace heating tube.

After filling the loading means was slowly raised to leave seperate concentrically arranged, hollow columns of particulate boron nitride, silicon carbide-resin, and silicon. After removal of the loading means, the top space was filled with carbon felt discs and capped with a rubber gasket and a metal plate. A vacuum was applied to the lower end of the furnace tube.

An induction coil having twelve turns of 3/16 inch outside diameter copper tubing with a coil inside diameter of 3⅛ inches and a length of three inches, was connected to a 450 KHZ, 2½ KW Lepel induction power supply and the coil started at the top of the furnace tube using a 0.8 plate current power input. The coil was lowered along the furnace tube at a rate of 0.33 inch per minute. The coil was stopped and the power turned off when the bottom of the quartz tube was approached. The furnace tube was then allowed to cool to room temperature, opened and the tubular product removed. The siliconized silicon carbide tube was easily removed from the quartz furnace tube as the boron nitride was still in loose granular form and unaffected by infiltration process. The heating element was easily removed from the siliconized silicon carbide tube as the silicon column had been removed by infiltration into the silicon carbide column. The siliconized silicon carbide tube product was found to be round and straight with little porosity in the microstructure. The silicon carbide volume in the microstructure of the product was estimated by visual inspection to be about 50%. The outside diameter of the product was about 2.16 inches and the inside diameter of the product was about 1.97 inch.

A photomicrograph of the product showed a continuous phase of silicon containing discontinuous phase of silicon carbide as discrete islands.

EXAMPLE 2

In this example, graphite powder having an approximate grain size of minus 30 mesh and a tap density of 0.58 g/cm was used in place of the silicon carbide-resin component as was used in Example 1 and in place of the furnace heating element a core of insulating grain was used. The procedure used otherwise followed that of example 1.

A photomicrograph of a polished section of the tubular product revealed that the graphite particles were not completely converted to silicon carbide and that only a thin layer of silicon carbide was present on the surface of the graphitè particles which were in turn surrounded by a continuous matrix of silicon. The silicon matrix occupied about sixty percent by volume of the product.

EXAMPLE 3

In this example the furnace tube was charged with concentric layers of insulation grain, silicon grain and graphite powder comprised of spherically-shaped particles, having a minimum particle size of 100 microns packed around a core of insulation grain. Otherwise the procedure of Example 1 was followed.

A photomicrograph of the product showed a continuous phase of silicon occupying about 55 volume percent having a discontinuous phase of particulate graphite occupying the remaining volume. The product showed a substantially complete lack of a silicon carbide phase, that is, the starting graphite particles remained substantially completely unreacted. The product exhibited excellent resistance to thermal stress failure, surviving a temperature change of over 1300 degrees Centigrade.

While the present invention has been described in detail in connection with specific embodiments thereof, it will be understood that further embodiments and modifications may be made without departing from the spirit and scope of the appended claims.

What is claimed is:

1. A substantially two phase composite material in a hollow, tubular form comprised of a continuous first phase comprised of silicon metal occupying from about thirty to about seventy percent by volume of said composite material, said continuous first phase containing a second discontinuous phase of particulate carbon having a particle size greater than about 100 microns, said composite characterized by a substantial lack of silicon carbide.

2. The composite material of claim 1 wherein the particulate carbon is graphite.

3. The composite material of claim 1 wherein the particulate material is spherically-shaped.

4. The composite material of claim 2 wherein the silicon metal phase occupies from about 35 to about 65 percent by volume of the composite material.

5. The composite material of claim 1 wherein the particulate carbon has a maximum size of about 500 microns.

6. A hollow tubular article fabricated by the method which comprises the steps of:
   a) dry casting a first hollow, vertical tubular column of a particulate material,
   b) dry casting a second hollow, vertical tubular column of a particulate material contiguous to, and in concentric relation to, said first column, the particulate material of one column comprised of silicon, and the particulate material of the other column comprised of material selected from the group of silicon carbide, carbon or mixtures thereof, said particulate material having an average particle ranging from about 75 to about 500 microns,
   c) heating said columns to a siliciding temperature to infiltrate substantially entirely all of said silicon from said first column into said second column, and
   d) cooling said infiltrated column to form a hollow, dimensionally stable ceramic tube comprised of substantially two phases, a first continuous of silicon metal occupying from about 30 to about 70 percent by volume of the said article, said first phase containing a second discontinuous phase comprised substantially completely of particulate carbon having a size greater than 100 microns, said article having a substantial lack of a silicon carbide phase in excess of any silicon carbide in the particulate material of said other column.

7. The article of claim 6 wherein the article contains silicon, silicon carbide and carbon.

8. The article of claim 6 wherein the particulate carbon material is spherically-shaped.

9. A hollow, tubular rection sintered article comprised substantially of two phases, a continuous first phase of silicon metal compising from about 30 to about 70 percent by volume of said article, said first phase forming the matrix for second discontinuous phase comprised substantially completely of particulate carbon material having a particle size ranging from about 100 microns to about 500 microns, said article having a substantial lack of a silicon carbide phase.

10. The article of claim 9 wherein the particulate carbon material is graphite.

11. The article of claim 9 wherein the particulate carbon material is spherically-shaped.

* * * * *